March 23, 1965 E. KRULL 3,174,395
SLIDE-CHANGING DEVICE FOR PROJECTORS
Filed Aug. 10, 1961 2 Sheets-Sheet 1

Inventor
Ernst Krull
by
Michael J. Striker

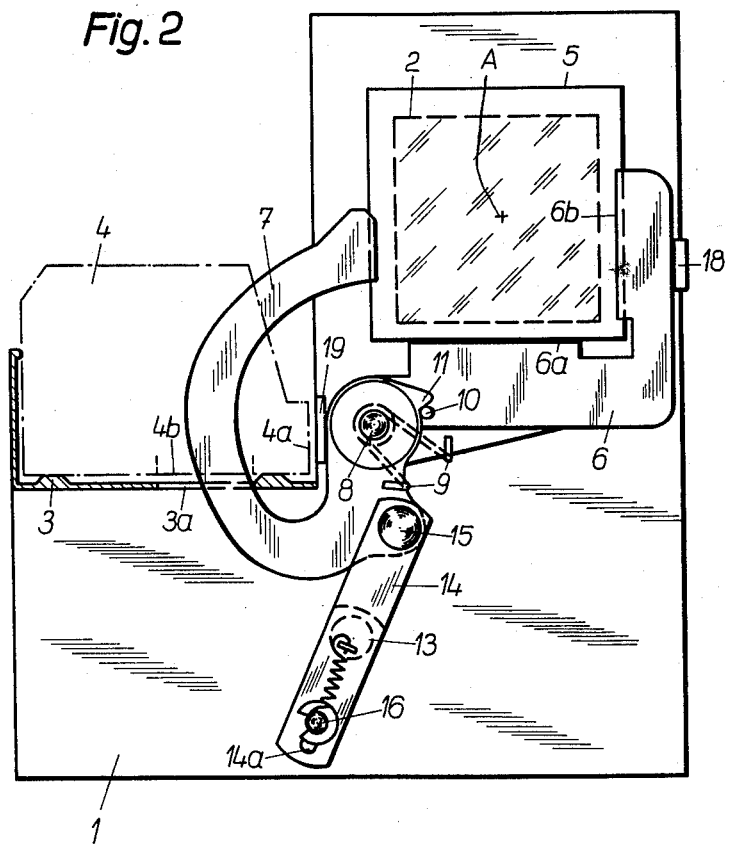

3,174,395
SLIDE-CHANGING DEVICE FOR PROJECTORS
Ernst Krull, Hofheim, Taunus, Germany, assignor to
Braun Aktiengesellschaft, a corporation
Filed Aug. 10, 1961, Ser. No. 130,650
Claims priority, application Germany, Mar. 7, 1961,
B 61,560
6 Claims. (Cl. 88—28)

The invention comprises improvements relating to a slide changing device for projectors of the type in which, in use, a number of plate-like slides in a magazine to the side of and below the optic axis of the projector are sequentially placed in position for projection by means of a pair of gripping tongs driven by a motor acting through a crank drive. The magazine can be slid in a direction parallel to the optic axis. The two claws of the tongs are resiliently connected together and one claw engages the slide through an opening in the bottom of the magazine and pushes it against the other claw which is angular so as to butt against the top and one side of the slide. The slide is held in this manner while it is moved into the image plane of the projector and until it is replaced in the magazine. A slide-changing arrangement having all the features mentioned in the present paragraph is, for the sake of brevity, referred to below as an arrangement "of the type described."

The advantage of a slide changing arrangement of the type described, over other arrangements in which the slide is pushed along in a guide or is gripped on its two long sides only, is that the slide during the whole of the movement and during projection is only held by the tongs and therefore always is maintained in its correct position. Trouble in projection due, for example, to tilting of the slide in its guides during displacement or slipping in the tongs is therefore substantially avoided.

In the known arrangement of this type (cf. German patent specification 1,063,828), the two claws of the gripping tongs are arranged so that they can be slid on a pin which is transverse in relation to the optic axis and tilted at oblique angle upwards. However, this linear guiding system has, as is the case with other slide-changing arrangements with sliding parts, also the disadvantage of liability to incorrect functioning after considerable use owing to wear or dirt. Linear guiding systems must always be exactly adjusted in order to be able to function perfectly and they need a comparatively complicated and expensive device for deriving suitable movement from a rotating crank.

One object of the improvements is to make possible the construction of a slide-changing arrangement of the type described in which these disadvantages are avoided. One important feature of the invention is that both gripping claws of the tongs are pivoted.

This has the advantage that there is no sliding movement of the slide or the prongs. A slide-changing device according to the invention can be easily constructed with a high degree of accuracy owing to the exclusive use of swivel joints.

By causing the claws of the tongs to swing or pivot around a single common axis an especially favourable spatial arrangement with economy in bulk is achieved.

Conveniently the means for guiding the magazine and the pivotal axis of the claws of the tongs are arranged in such a fashion in relation to the optic axis that after gripping the slide the two claws pivot through 90°. This enables the magazine to be placed in its normal position with its bottom horizontal so that there is no danger of the slides being tipped out as is the case with laterally open and obliquely placed magazines.

Further features of the invention will be apparent from the following description of the accompanying drawings which show a construction embodying the invention by way of example only.

FIGURE 2 is the same view after the tongs have been closed and placed into the projection position.

Figure 1:
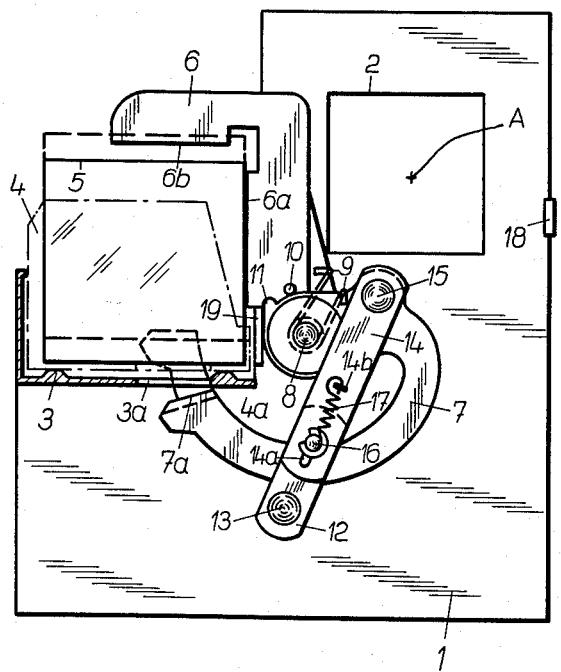
FIGURE 1 is a section of the slide-changing arrangement with the tongs open, taken through the image plane.

The outline of the housing 1 of the projector is shown in FIGURES 1 and 2. In its upper part the housing has the picture window 2 in whose centre the optic axis A lies. Somewhat below and to the side there is a slide rail 3 parallel to the optic axis A along which a box-like magazine 4 (shown in dotted lines) can be slid. The magazine, in whose grooves or compartments the individual plate-like slides 5 are mounted, is open at the top and to the side, that is to say, the side wall 4a facing to the optical system is low while in each groove there is an opening 4b in the bottom of the magazine (FIGURE 2). There is a corresponding opening 3a in the bottom of the slide rail 3.

Figure 3:
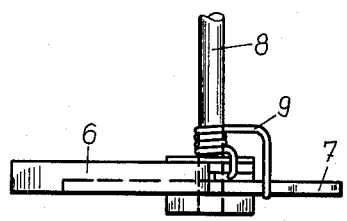
FIGURE 3 shows the tongs from above with certain parts cut away.

The slide-changing arrangement comprises tongs whose two claws 6 and 7 are journalled, the one behind the other, on a common shaft or pin 8 (FIGURE 3). The magazine guide or rail 3 and the pin 8 are arranged in such a manner in relation to the optic axis A that the claws 6 and 7 when closed can make a pivotal movement of 90°. The claws 6 and 7 are coupled together by a spring 9 which is wound about the pin 8 and has its free ends engaging the limbs of the claws. The spring 9 urges the claws 6 and 7 into the closed position. In order to define the smallest possible closed position of the tongs claw 6 carries a stop or pin 10 which co-operates with a stop or projection 11 on the other claw 7 (FIGURE 2).

Claw 6 is rectangular and has, as shown in FIGURE 1, an upright plane abutment edge 6a and a groove-like or grooved transverse edge 6b. In the initial position, shown in FIGURE 1, these edges are able to grip the slide 5 at the top and along its inside lateral edge. The other claw 7 is arcuate and also has a groove-like head 7a which can pass through the opening 3a and the opening 4b in the rail 3 into the magazine 4 to engage the lower side of the slide 5.

For driving the tongs use is made of a rotating crank 12 (FIGURE 1) which is locked on a shaft 13 connected with a motor (not shown). The movement of the crank 12 is transmitted to the arcuate claw 7 by means of a link or coupling bar 14. The joint 15 between the claw 7 and the coupling bar 14 is purely pivotal while the joint between the crank 12 and the coupling bar 14 comprises a bolt or pin 16, fixed on the crank 12, which can slide in a slot 14a on the coupling bar 14 in the manner of a sliding and turning joint. This arrangement is provided to compensate for tolerances in dimensions of the slides. A spring 17 stretched between the bolt 16 and a projection 14b of the coupling bar 14 pulls the bolt 16 toward one end of the slot 14a.

The crank drive, constructed in the manner of an articulated quadrilateral, is so dimensioned that the arcuate claw 7 completes a movement of over 90°, as will be made clear below, while the movement of the resiliently coupled rectangular claw 6 is limited to an angle of 90° by means of abutments 18 and 19 (FIGURE 2) unitary with the housing.

The slide-changing arrangement works in the following manner:

In the open position of the tongs shown in FIGURE 1 the crank drive is in the extended position and the head 7a of the claw 7 has moved out of the magazine 4 a position below the magazine. The rectangular claw 6 lies against the abutment 19.

On further rotation of the crank 12 the claw 7 pivots in a clockwise direction about the pin 8, the head 7a passes through the openings 3a and 4b of the rail 3 and the magazine 4, lifts the slide 5 from below and causes it to abut against the edges 6a and 6b of the claw 6, as shown in dotted lines in FIGURE 1. Owing to the groove-like form of the head 7a of the claw 7 and of the transverse edge 6b of the claw 6, the slide 5 is brought into the correct position into the image plane.

The tongs closed about the slide now pivot with the latter into the projection position which is shown in FIGURE 2. The rectangular claw 6 here lies against the abutment 18 while the crank drive is in an overlapping position.

On further rotation of the crank 12 the gripping tongs now swing in an anti-clockwise direction backwards until the movement of the rectangular claw 6 is halted by the abutment 19. The arcuate claw 7 however moves against the wound spring 9 and its head 7a swings out of the magazine 4 into the position shown in FIGURE 1 with solid lines, that is to say the open position of the tongs. The slide is thereby released and falls back into the corresponding slide or groove in the magazine.

While a preferred form of construction has been described to enable those skilled in the art to take advantage of the present invention, it is to be understood that the monopoly claimed is not limited to the details shown and described but is defined by the scope and spirit of the following patent claims.

I claim:

1. In a photographic projector, in combination, support means for supporting a magazine which contains slides which are to be sequentially moved from the mazine to a projecting position and back to the magazine; gripping lever means turnably carried by said support means for gripping a slide at edges thereof and transporting the slide, during turning of said gripping lever means, between the magazine and the projecting position, said gripping lever means consisting of a pair of levers one of which engages a slide at its bottom edge and the other of which engages a slide at its top edge, while the slide is in the magazine, and at least one of said levers also engaging the slide at a side edge thereof while the slide is in the magazine, so that said one lever engages the slide at a pair of edges while the other of said levers engages the slide at a third edge thereof, said pair of levers having a common turning axis and said support means supporting said levers only for turning movement about said axis; and turning means operatively connected to said gripping lever means for turning the same to transport a slide between the magazine and the projecting position.

2. In a photographic projector, in combination, support means for supporting a magazine in a position extending parallel to the optical axis, the magazine containing a plurality of slides which are to be sequentially moved between the magazine and a projecting position; an elongated shaft carried by said support means and extending parallel to the optical axis; an arcuate lever turnably carried by said shaft and having a rest position where a free end of said arcuate lever is located beneath the magazine, the latter being formed at its underside with an opening through which the free end of the arcuate lever can move into engagement with the bottom edge of a slide in the magazine; a substantially L-shaped lever also turnably carried by said shaft and having a pair of legs one of which, in a rest position of said L-shaped lever, extends along an upper edge of a slide in the magazine, and said levers being located in a common plane so that the free end of said arcuate lever and said one leg of said L-shaped lever will engage a slide at its upper and lower edges, respectively, while the slide is in the magazine, when the arcuate lever is turned toward the L-shaped lever; spring means operatively connected to said levers for urging said free end of said arcuate lever and said one leg of said L-shaped lever toward each other; stop means engaging said L-shaped lever when it is in its rest position to prevent movement thereof with said arcuate lever when the latter is returned to its rest position where its free end is located beneath the magazine; and crank means operatively connected to said arcuate lever for turning the same first upwardly so that its free end will engage the underside of a slide whereupon the slide will be gripped between said levers and both levers will then turn together during turning of said arcuate lever by said crank means, said crank means turning said levers to an extent which locates a slide gripped between said levers in a projecting position, and said crank means also returning said levers to their rest positions, respectively, where they release a slide and are adapted to grip the next slide.

3. In a photographic projector as recited in claim 2, one of said levers carrying a projection and the other of said levers carrying a pin which is adapted to engage said projection for limiting the turning of said levers toward each other by said spring means.

4. In a photographic projector as recited in claim 2, the other leg of said L-shaped lever, when it is in its rest position, being located along a vertical side edge of a slide in the magazine, so that the pair of levers during transportation of a slide engage the latter along three sides.

5. In a photograpic projector as recited in claim 2, a second stop means located in the path of turning of said L-shaped lever and engaging the latter to limit the turning thereof to an extent which will locate the slide in the projection position.

6. In a photographic projector, in combination, support means for supporting a magazine in a position extending parallel to the optical axis, the magazine containing a plurality of slides which are to be sequentially moved between the magazine and a projecting position; an elongated shaft carried by said support means and extending parallel to the optical axis; an arcuate lever turnably carried by said shaft and having a rest position where a free end of said arcuate lever is located beneath the magazine, the latter being formed at its under-side with an opening through which the free end of the arcuate lever can move into engagement with the bottom edge of a slide in the magazine; a substantially L-shaped lever also turnably carried by said shaft and having a pair of legs one of which, in a rest position of said L-shaped lever, extends along an upper edge of a slide in the magazine, and said levers being located in a common plane so that the free end of said arcuate lever and said one leg of said L-shaped lever will engage a slide at its upper and lower edges, respectively, while the slide is in the magazine, when the arcuate lever is turned toward the L-shaped lever; spring means operatively connected to said levers for urging said free end of said arcuate lever and said one leg of said L-shaped lever toward each other; stop means engaging said L-shaped lever when it is in its rest position to prevent movement thereof with said arcuate lever when the latter is returned to its rest position where its free end is located beneath the magazine; and drive means operatively conected to said arcuate lever for turning the same first upwardly so that its free end will engage the underside of a slide whereupon the slide will be gripped between said levers and both levers will then turn together during turning of said arcuate lever by said drive means, said drive means turning said levers to an extent which locates a slide gripped between said levers in a projecting position, and said drive means also returning said levers to their rest positions, respectively, where they release a slide and are adapted to grip the next slide.

References Cited by the Examiner

UNITED STATES PATENTS

| | | | |
|---|---|---|---|
| 1,371,871 | 3/21 | Dietz | 88—27 |
| 2,532,775 | 12/50 | Leonard | 88—28 |
| 2,909,098 | 10/59 | Briskin et al. | 88—28 |
| 2,949,814 | 8/60 | Bougton et al. | 88—28 |
| 3,079,840 | 3/63 | McMaster et al. | 88—28 |

NORTON ANSHER, *Primary Examiner*.

EMIL G. ANDERSON, WILLIAM MISIEK, *Examiners*.